United States Patent [19]
Kondo et al.

[11] Patent Number: 4,718,052
[45] Date of Patent: Jan. 5, 1988

[54] HEAD ASSEMBLY FOR OPTICAL DISC

[75] Inventors: Mitsushige Kondo; Shinsuke Shikama; Keizo Kono; Teruo Fujita, all of Kyoto, Japan

[73] Assignee: Mitsubishi Denki Kabushiki Kaisha, Tokyo, Japan

[21] Appl. No.: 781,993

[22] Filed: Sep. 30, 1985

[30] Foreign Application Priority Data

| Oct. 1, 1984 | [JP] | Japan | 59-205788 |
| Oct. 1, 1984 | [JP] | Japan | 59-205789 |
| Oct. 12, 1984 | [JP] | Japan | 59-213801 |
| Feb. 19, 1985 | [JP] | Japan | 60-30842 |

[51] Int. Cl.[4] .................................. G11B 7/095
[52] U.S. Cl. ......................... 369/44; 369/122; 369/120; 369/112; 369/46; 350/96.11; 350/96.18; 350/96.19; 250/202
[58] Field of Search ............... 369/122, 121, 120, 112, 369/111, 46, 45, 44; 250/201, 202; 350/96.13, 96.14, 96.11, 96.12, 96.18, 96.19

[56] References Cited

U.S. PATENT DOCUMENTS

| 4,425,023 | 1/1984 | Matsumoto | 369/122 |
| 4,468,084 | 8/1984 | Hutcheson | 350/96.11 |
| 4,518,219 | 5/1985 | Leonberger | 350/96.19 |
| 4,640,574 | 2/1987 | Unger | 350/96.11 |

FOREIGN PATENT DOCUMENTS

| 79441 | 5/1984 | Japan | 369/122 |
| 107431 | 6/1984 | Japan | 369/122 |

*Primary Examiner*—Alan Faber
*Attorney, Agent, or Firm*—Bernard, Rothwell & Brown

[57] ABSTRACT

An optical head assembly for recording information on an optical disc or for taking out information already recorded, the optical head assembly including a semiconductor substrate and a dielectric light conducting layer formed on the substrate, the light conducting layer being internally formed with optical elements for converging laser beam from a laser beam source onto the optical disc and directing the reflected beam from the optical disc surface toward a photo detector. Output signal from the photo detector is used for reading information and also for allowing the optical head assembly to trace a track on the optical disc.

14 Claims, 52 Drawing Figures

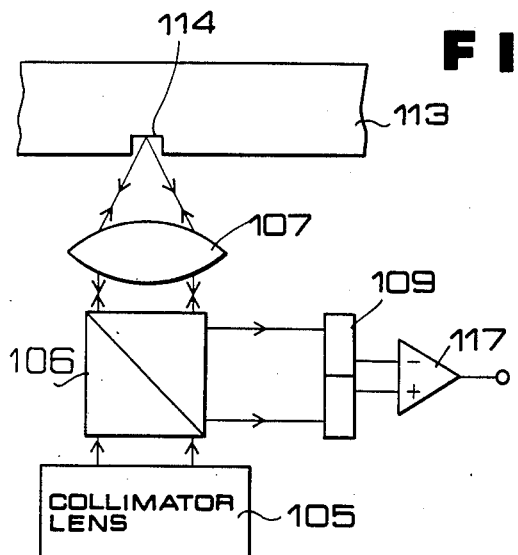
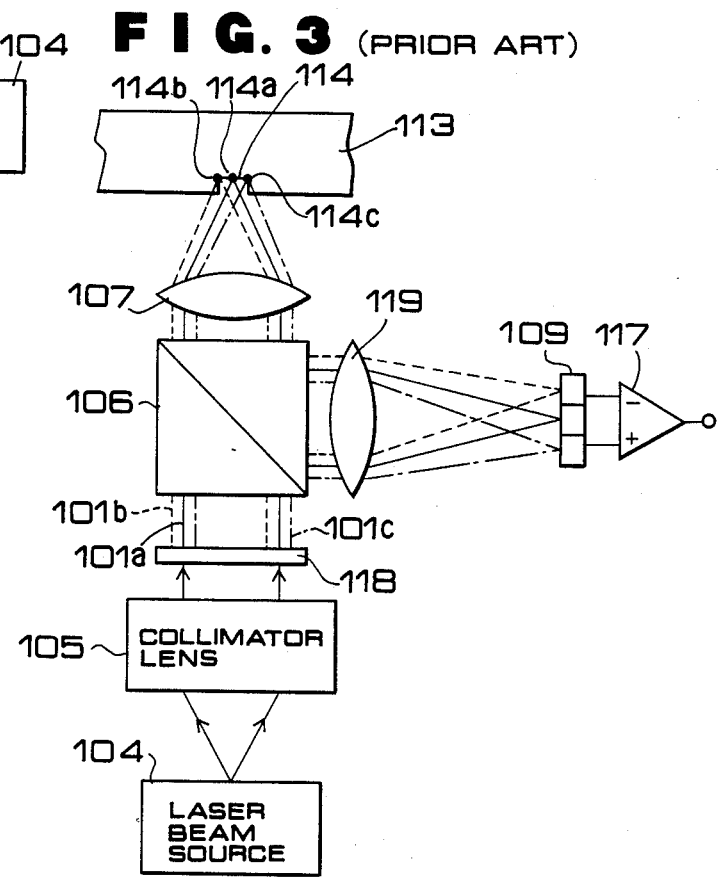

FIG. 2 (PRIOR ART)
FIG. 2a
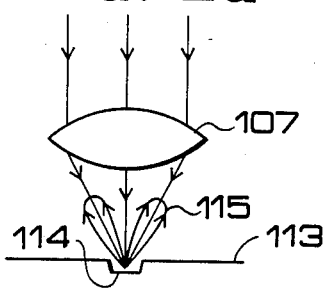
FIG. 2b
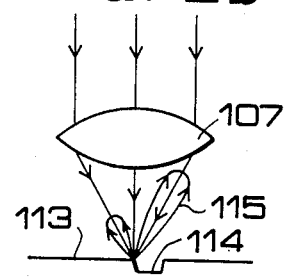
FIG. 2c
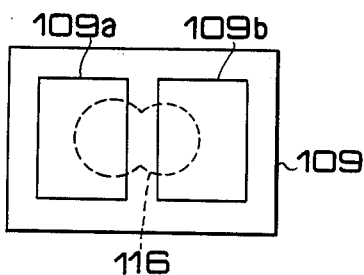
FIG. 2d
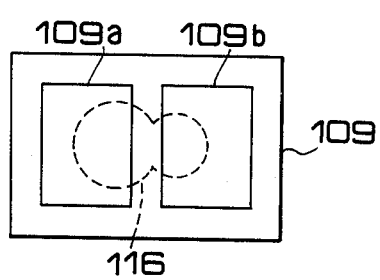
FIG. 2e
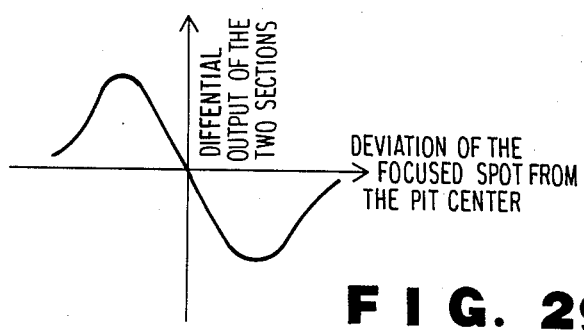
FIG. 2f
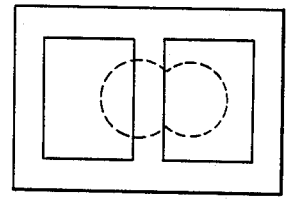
FIG. 2g
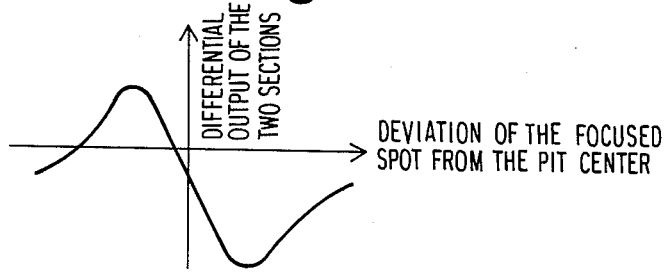

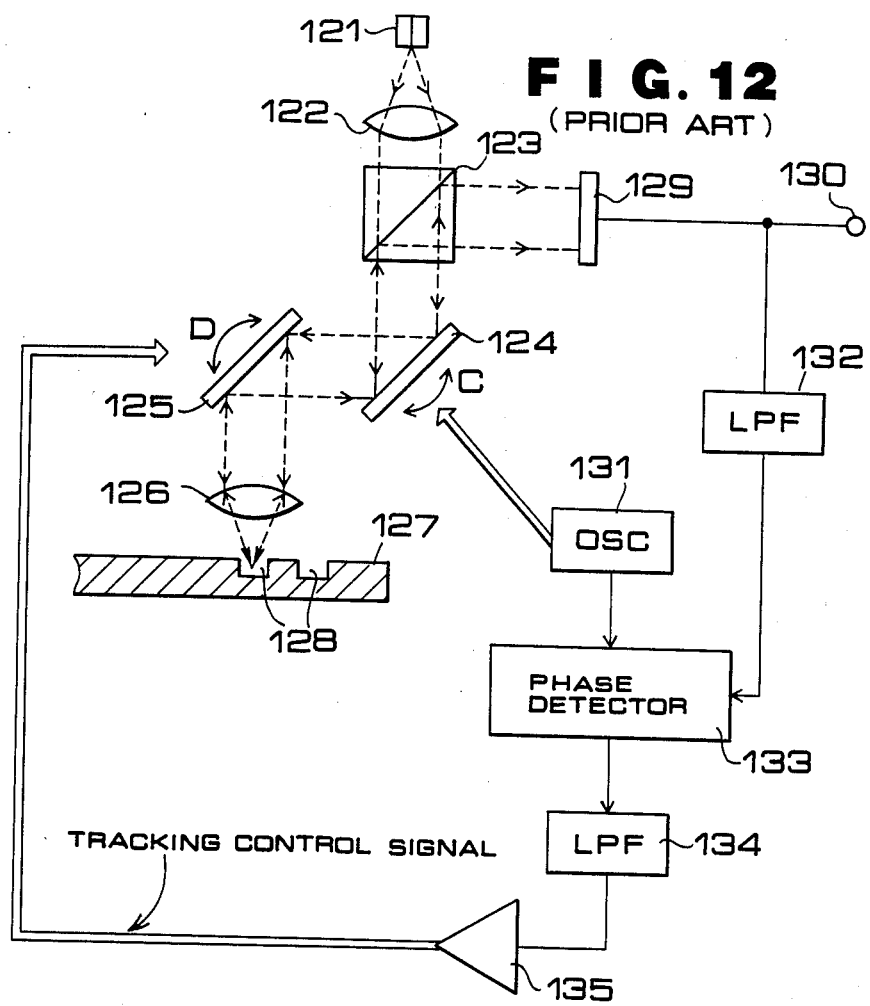
FIG. 12 (PRIOR ART)
FIG. 13 (PRIOR ART)
FIG. 13a
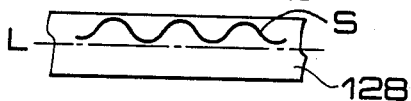
FIG. 13d
FIG. 13b
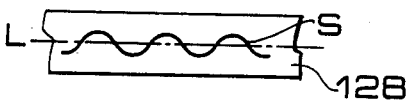
FIG. 13e
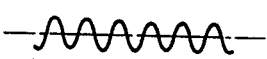
FIG. 13c
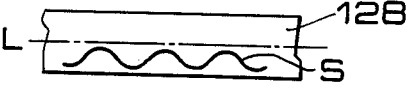
FIG. 13f

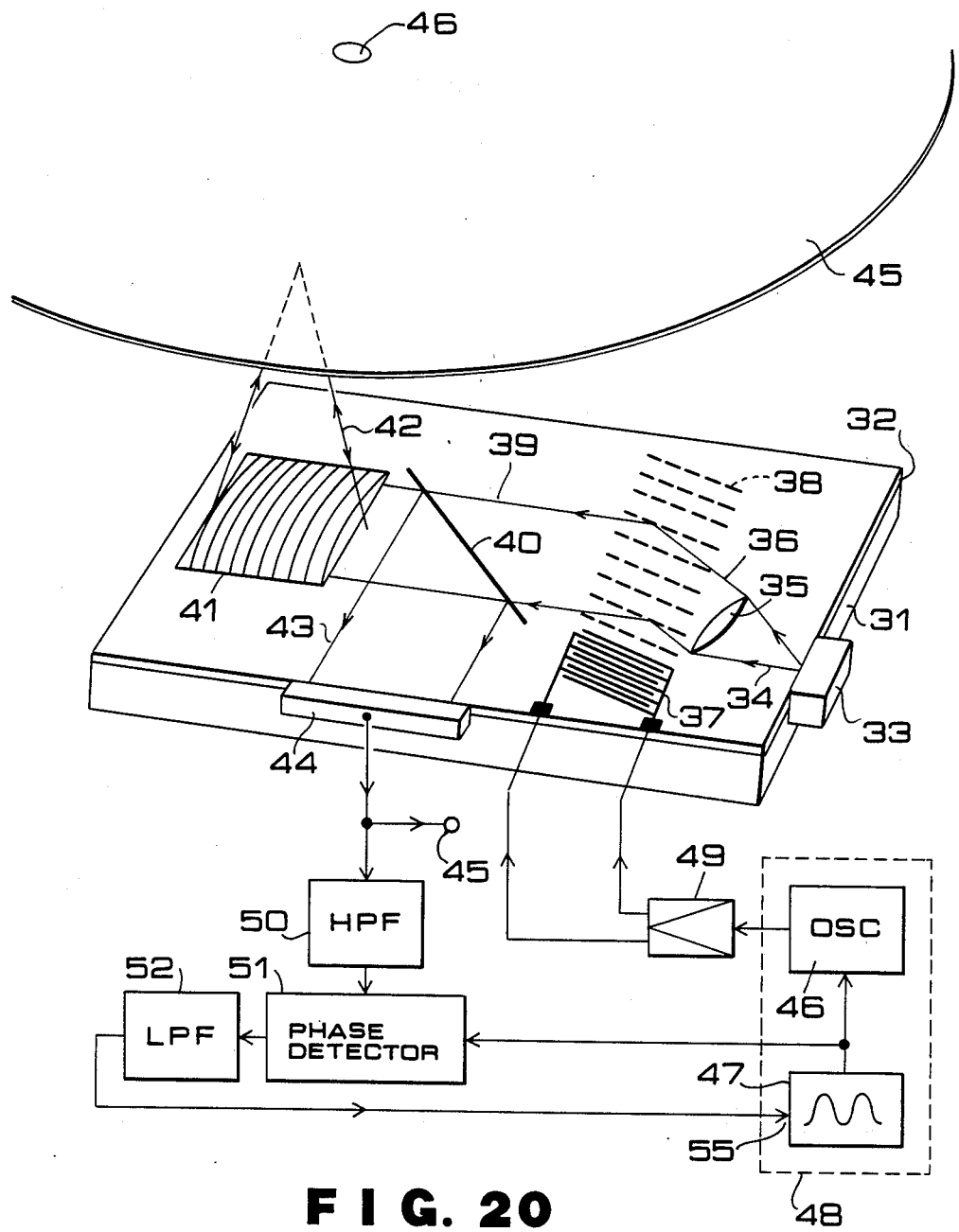
F I G. 20

FIG. 22 (PRIOR ART)
FIG. 22a
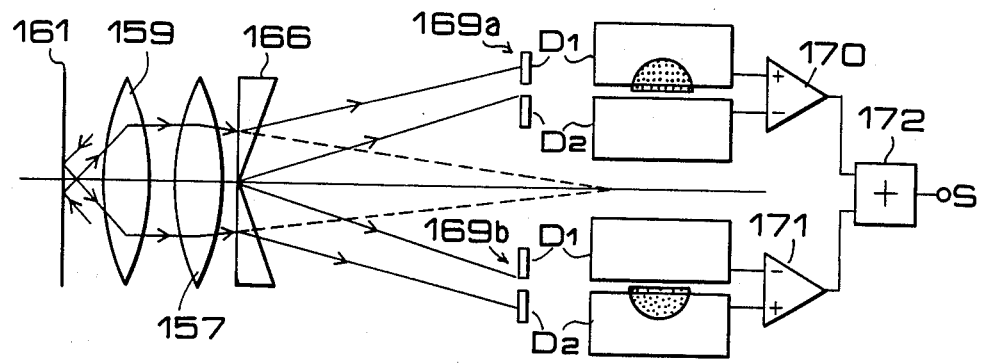
FIG. 22b
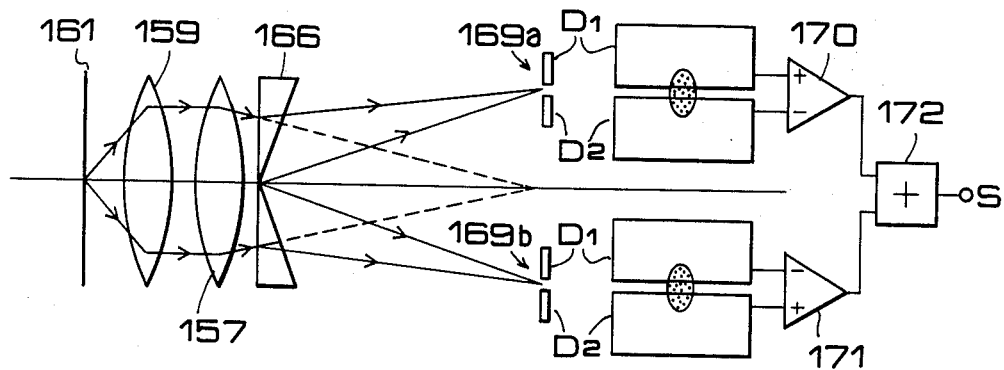
FIG. 22c
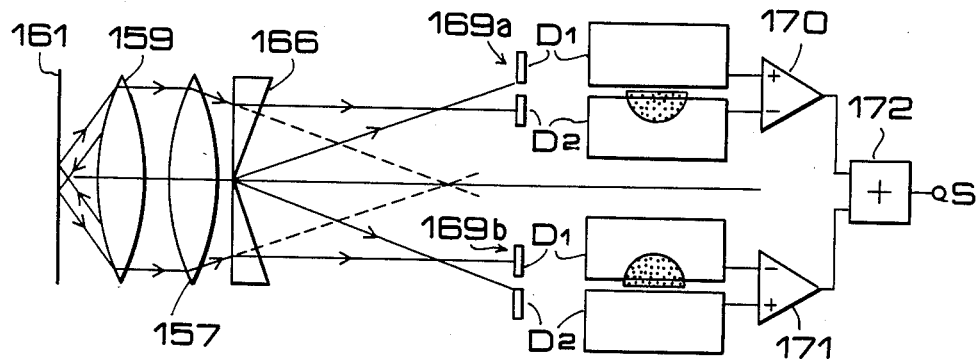

FIG. 23 (PRIOR ART)
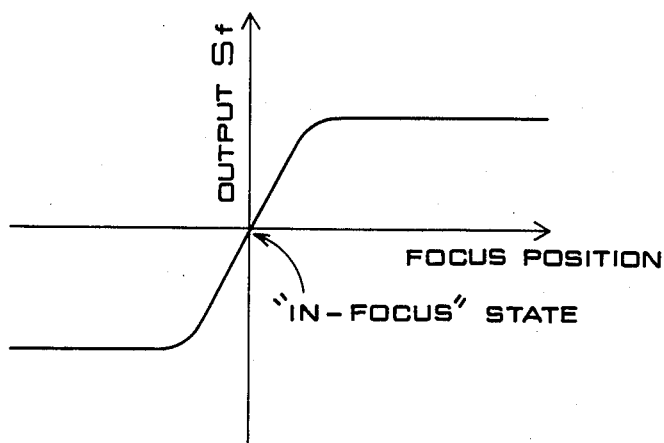
FIG. 24 (PRIOR ART)
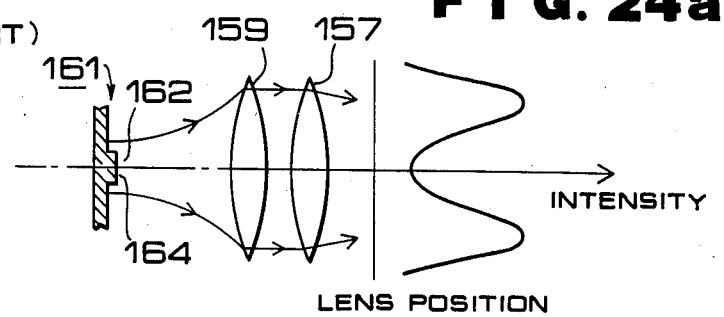
FIG. 24a
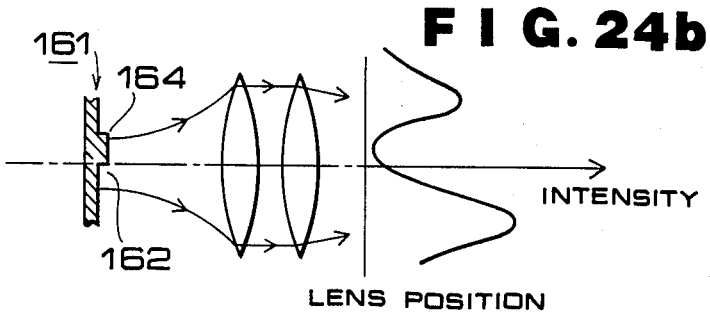
FIG. 24b
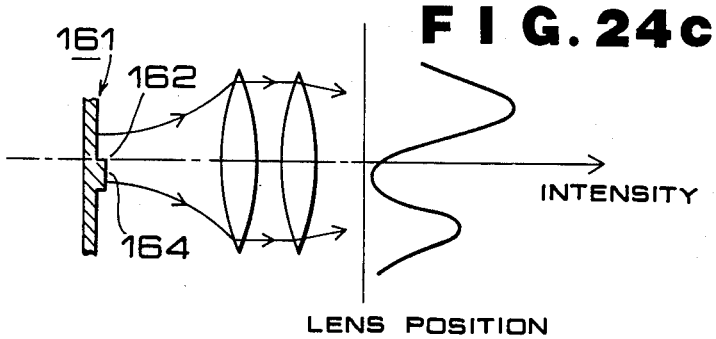
FIG. 24c

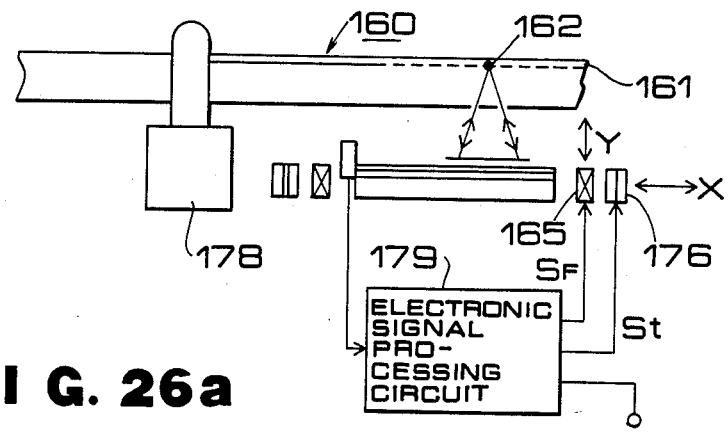
FIG. 26a
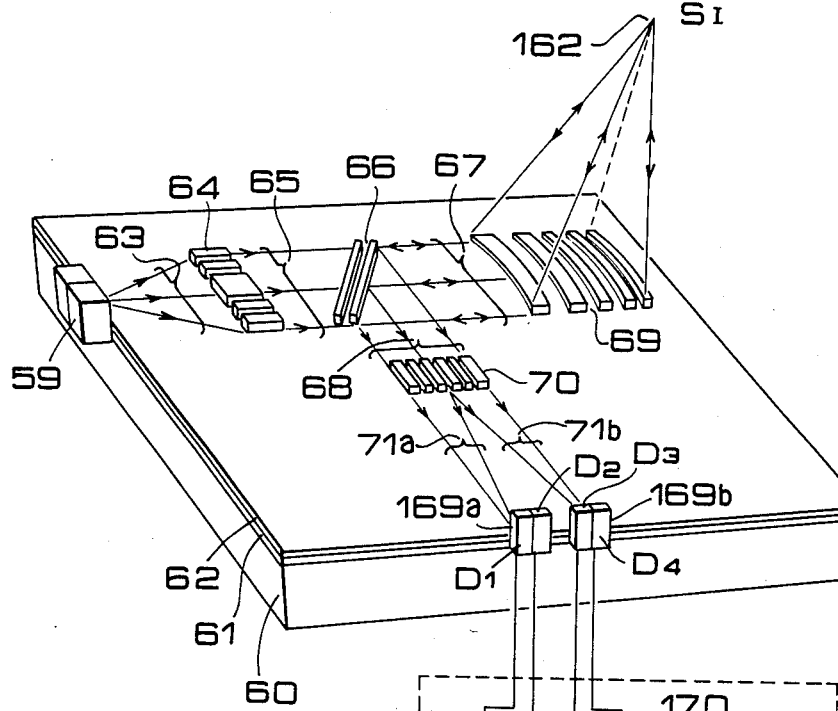
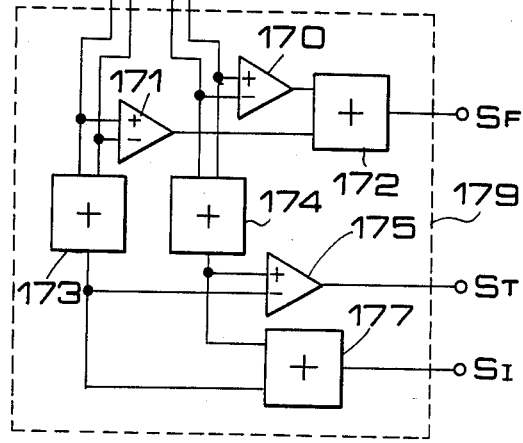
FIG. 26b

HEAD ASSEMBLY FOR OPTICAL DISC

BACKGROUND OF THE INVENTION

1. Field of the Invention

The present invention relates to a head assembly for recording information on an optical disc for reading out information already recorded.

2. Description of the Prior Art

FIG. 1 is a block diagram of a conventional optical head assembly which is provided with a laser diode 104, a collimator lens 105, a beam splitter 106, an objective lens 107 and a photo detector 109. Laser beam from the laser diode 104 is collimated through the collimator lens 105, which collimated beam passes through the beam splitter 106 and is focused by the objective lens 107 to form a spot on a disc 113. Part of the incident beam is reflected by the disc 113, again passes through the objective lens 107, then its advancing direction is changed 90° by the beam splitter 106 and thereafter a conversion is made into an electric signal by the photo detector 109. A differential amplifier 117 detects a difference in output between two sections in the photo detector.

Tracks (or guide grooves) 114 which comprises pits are formed on the disc 113. In order to record or reproduce information accurately, a beam spot must be positioned at the center of the track 114. In this connection, the optical head assembly in question is provided with a tracking sensor to detect a deviation of a beam spot from the center of the track 114.

Operation of the tracking sensor will now be explained. FIG. 2 shows a principle of tracking sensor called a push-pull method. As shown in FIG. 2(a), when a focused spot is positioned at the center of the track 114, a reflected laser beam is approximately bisected to form two reflected beams 115, which in turn pass through the objective lens 107 and the beam splitter 106 and form an image symmetric with respect to the center on the photo detector 109, as shown in FIG. 2(c). The photo detector 109 is divided into two sections 109a and 109b which are equal in characteristic and shape, as shown in FIG. 2(c). According to a method for realizing such characteristic, an effective surface of the photo detector 109 is divided in two by a symmetry axis. When a focused spot is positioned at the center of a pit, reflected beams irradiate the two sections of the photo detector equally, as shown in FIG. 2(c), so electrical outputs of the photo detector 109 are equal to each other as in FIG. 2(e). On the other hand, in the event a focused spot deviates from the center of a pit, the right and left of reflected beams become asymmetric as shown in FIG. 2(b), and also as to the image on the photo detector, the two sections are different in the quantity of light irradiated as shown in FIG. 2(d). Therefore, by taking the difference in electrical output between the two sections, there is obtained such a characteristic in which the axis of abscissa and that of ordinate represent a deviation of a focused spot from the pit center and a difference in electrical output, respectively.

In the event a central optical axis of the photo detector 109 itself deviates from an incident optical axis of the beam splitter 106, the image on the photo detector also shifts as shown in FIG. 2(f) and the difference in electrical output becomes like that shown in FIG. 2(g).

Thus, the conventional optical head assembly shown in FIG. 1 comprises the combination of such discrete parts as lenses, beam splitter and photo detector. In assembling, therefore, it has been necessary to make a fine adjustment of component mounting positions in order to align their optical axes accurately. According to a method for simplifying the construction of an optical system, a thin film dielectric light conducting layer, a converging type grating coupler and a thin film-like collimator lens are integrated on a single substrate. In this type of optical head assemblies, however, a tracking sensor function has not been considered yet.

Another conventional tracking system, as shown in FIG. 3, includes a diffraction grating 118 disposed between collimator lens 105 and beam splitter 106 and a sensor lens 119 disposed between beam splitter 106 and photo detector 109, in addition to the components shown in FIG. 1. The photo detector 109 used in this method comprises a first or central element for detecting a zero order beam and two side elements positioned on both sides thereof.

Laser beam emitted from the laser beam source 104 becomes a collimated beam, which in turn is diffracted by the diffraction grating 118.

In this type of device, usually a total of three diffracted beams—a zero order beam of a high intensity and two first order beams—are utilized. These three beams pass through the beam splitter 106 and are focused by the objective lens 107 to form three focused spots 114a, 114b and 114c on the track 114 of the recording medium 113.

The beams reflected by the track 114 pass through the objective lens 107, then are bent 90° by the beam splitter 106, condensed by the sensor lens 119 and are incident on the photo detector 109.

In order to record or reproduce information accurately with respect to the track, the focused spot 114a of beam on the surface of the optical disc must be positioned at the center of the track 114 as shown in FIG. 4. To this end, optical head assemblies of this type are provided with a function (tracking sensor function) for detecting a deviation of the focused spot from the track center.

According to a tracking sensor method called three-beam method, as shown in FIG. 4, the focused spot 114a, of the zero order beam is located on a center line 120 of the track 114, while the two focused spots 114b and 114c of the first order beams are biased with respect to the center line 120 of the track 114.

Reflected beams from the three focused spots are detected each independently by the three elements of the photo detector 109. Then, a difference between output signals corresponding to the quantities of light of the two first order diffracted beams among three output signals from the photo detector 109 is detected by the differential amplifier 117 to obtain such an output as shown in FIG. 2(e). In this way, a deviation from the center of the focused spot of the zero order beam can be detected as an electric signal.

Thus, the conventional optical head assembly comprises the combination of discrete optical parts such as lens and beam splitter, so it has been necessary to use a fine adjustment mechanism in order to align the optical axes of those parts accurately in assembly. Particularly, in order to attain the tracking sensor function, it has been necessary to use a mechanism for rotating the diffraction grating.

Since the apparatus is constituted by such discrete parts and requires such fine adjustment mechanism, it becomes larger in size and the apparatus assembling and adjusting cost is increased.

To reduce the apparatus size and simplify its construction, there has been proposed a construction in which optical elements are integrated on a single substrate. However, the tracking sensor function has not been considered.

SUMMARY OF THE INVENTION

The present invention employs an optical integrated circuit (IC) on which principal optical components of an optical head are formed monolithically, thereby lightening the burden of a delicate work which is required for disposing discrete optical components in predetermined positions, to permit an accurate positioning.

In one aspect of the present invention, the optical head assembly includes an optical IC having a collimator lens, a beam splitter and a converging type grating coupler which are formed in a light conducting layer of a dielectric thin film, as well as a laser beam source and a photo detector which are connected to the optical IC. The photo detector has two light-receiving surfaces which are disposed in positions symmetric with respect to the center in a transverse direction of a flat beam conducted from the beam splitter.

The beam which has been directed from the converging type grating coupler to the track on the optical disc, then reflected by the track surface, passed through the grating coupler and the beam splitter and reached the photo detector, is received by the photo detector separately as two beams on both sides of the beam center, which beams are thereby converted to electric signals of levels proportional to the respective intensities. A positional deviation of the beam or beam spot focused on the track from the converging type grating coupler corresponds to a beam distribution from the beam splitter to the photo detector. Therefore, the difference between the two electrical output signals provided from the photo detector indicates a positional deviation of the beam spot with respect to the track. Therefore, the position of beam spot with respect to a predetermined track can be easily adjusted using the magnitude of a difference between the two electrical output signals.

In another aspect of the present invention, the optical IC used in the optical head assembly further includes a diffraction grating disposed between the collimator lens and the beam splitter and a lens disposed between the beam splitter and the photo detector. This optical IC, made according to a method known as a three-beam method, has a function of generating a tracking signal, namely, a tracking sensor function.

In a further aspect of the present invention, the optical head assembly employs an optical IC having a surface acoustic wave generating means as means for vibrationally deflecting the beam which is conducted to a converging type grating coupler like the one mentioned above. A vibrationally deflected beam is effective in oscillating a focused spot relative to the track on the optical disc, thereby attaining a tracking sensor function of a higher accuracy.

Further, the present invention aims at providing an optical head assembly which has a function of focusing a beam spot automatically on an optical disc, in addition to the tracking sensor function. Signals for tracking and for automatic focusing can be taken out concurrently using the same optical system.

Other features and advantages of the present invention will become more apparent from the following description taken in connection with the drawings.

BRIEF DESCRIPTION OF THE DRAWINGS

FIG. 1 is a block diagram of a conventional optical head assembly;

FIGS. 2(a) to 2(g) show relations between track and beam spot in the optical head assembly of FIG. 1 as well as relations between beam spot deviations from track and output signals;

FIG. 3 is a block diagram of another conventional optical head assembly;

FIG. 1 illustrates a positional relation between the apparatus of FIG. 9 and an optical disc;

FIG. 12 is a block diagram of still another conventional optical head assembly;

FIGS. 13(a) to 13(f) illustrate relations between beam spot moving paths and output signals in the apparatus of FIG. 12;

FIG. 20 illustrates a modification of the optical head assembly of FIG. 18;

FIGS. 22(a) to 22(c) illustrate optical paths in "in-focus" state and "out-of-focus" state in the apparatus of FIG. 21(a);

FIG. 23 is a graph showing a relation between focus position and output Sf in FIG. 21(a);

FIGS. 24(a) to 24(c) show relations between beam spot positions relative to track and electrical output signals;

FIG. 26(a) illustrates an optical head assembly having both a tracking function and an automatic focusing function according to a still further embodiment of the present invention and FIG. 26(b) illustrates the apparatus of FIG. 26(a) in more detail;

DETAILED DESCRIPTION OF THE PREFERRED EMBODIMENTS

Embodiments of the present invention will be described hereinunder with reference to the drawings.

Figure 5:
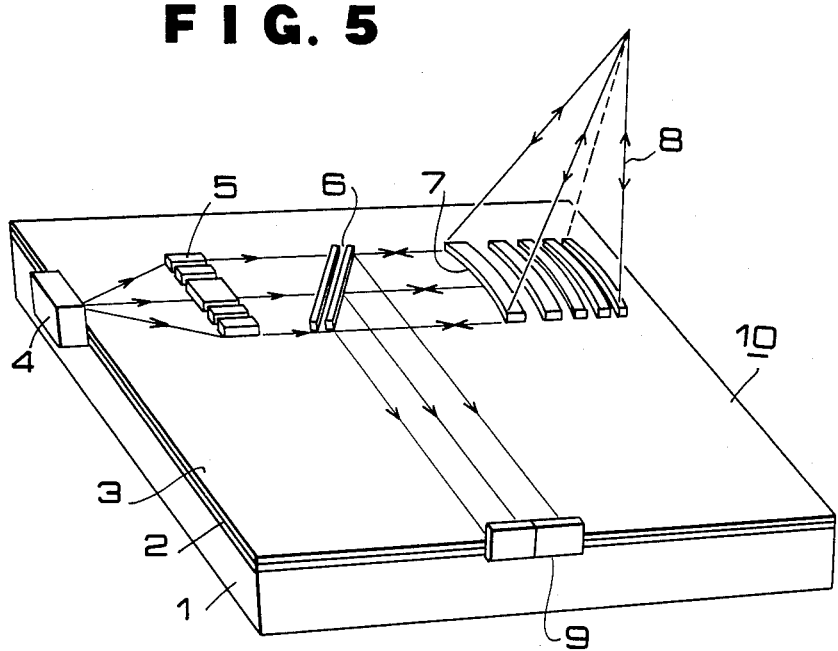
FIG. 5 is a perspective view of an optical head assembly according to an embodiment of the present invention.

Referring to FIG. 5, the reference numeral 10 represents a construction of a principal portion of an optical IC type head assembly, in which a buffer layer 2 is formed on a substrate 1 by such means as oxidation or vapor deposition, and a light conducting layer 3 comprising a dielectric thin film is formed on the buffer layer 2 by vapor deposition or other suitable means. Further, a collimator lens 5, a beam splitter 6 and converging type grating coupler 7 which comprises unequally spaced curves, are formed on the dielectric thin film light conducting layer 3 by a photolithographic method, an electron beam drawing method or an etching method. The numeral 4 denotes a laser diode for injecting a laser beam to the light conducting layer 3, and the numeral 9 denotes a photo detector having two light-receiving surfaces and attached to one end of the optical head assembly so as to be aligned in its center line with the center of an incident optical axis. The numeral 8 denotes a beam.

Figure 6A:
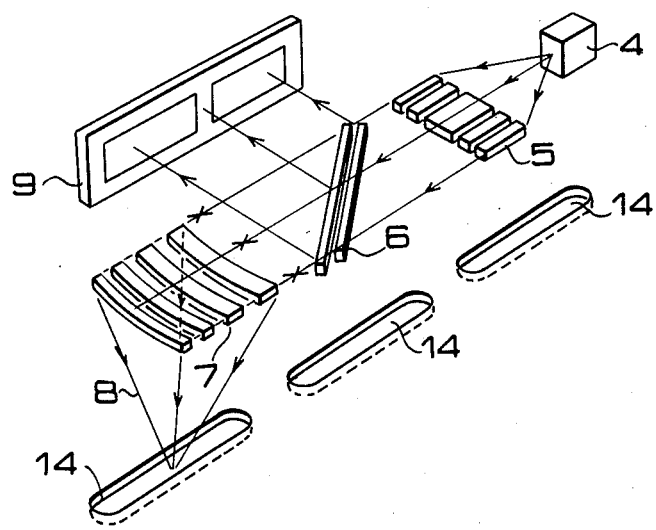
FIGS. 6(a), (b) and (c) illustrate a three-dimensional arrangement of optical elements in the apparatus of FIG. 5 and track.
Figure 6B:
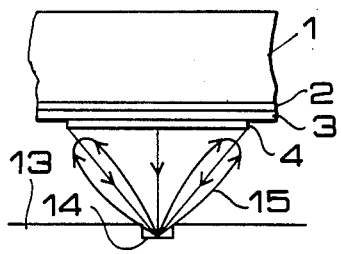
Figure 6C:
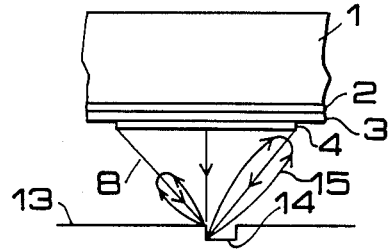

The optical head assembly of this embodiment operates as follows. In FIG. 5, laser beam emitted from the laser diode 4 which is attached to one end of the optical IC type head assembly 10, passes through the light conducting layer, becomes a collimated beam through the collimator lens 5, then passes through the beam splitter 6 and is emitted and converged from the light conducting layer into a free space to form a spot by means of the converging grating coupler 7. FIG. 6(a) shows a relation between a disc 13 and the optical head assembly, in which emitted and converged beam 8 forms a spot on the disc 13. The converged light beam is reflected by the disc surface. In this case, when the beam spot center is at the center of a pit 14, a reflected beam 15 is divided into two beams equal in intensity as shown in FIG. 6(b), which beams are incident on the converging grating coupler 7, again enter the light conducting layer and advance toward the beam splitter 6, then are bent toward the photo detector 9 by the beam splitter 6, then incident on the two light-receiving surfaces of the photo detector 9 and thereby converted to electrical outputs. By detecting a difference between the two electrical outputs of the photo detector 9, there is obtained the same characteristic as in FIG. 2(e).

Figure 8:
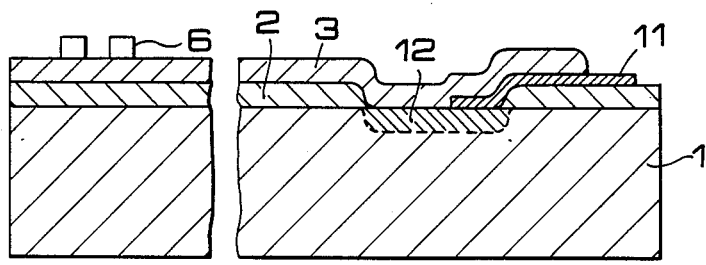
FIG. 8 is sectional view of an optical IC used in the apparatus of FIG. 7.
Figure 7:
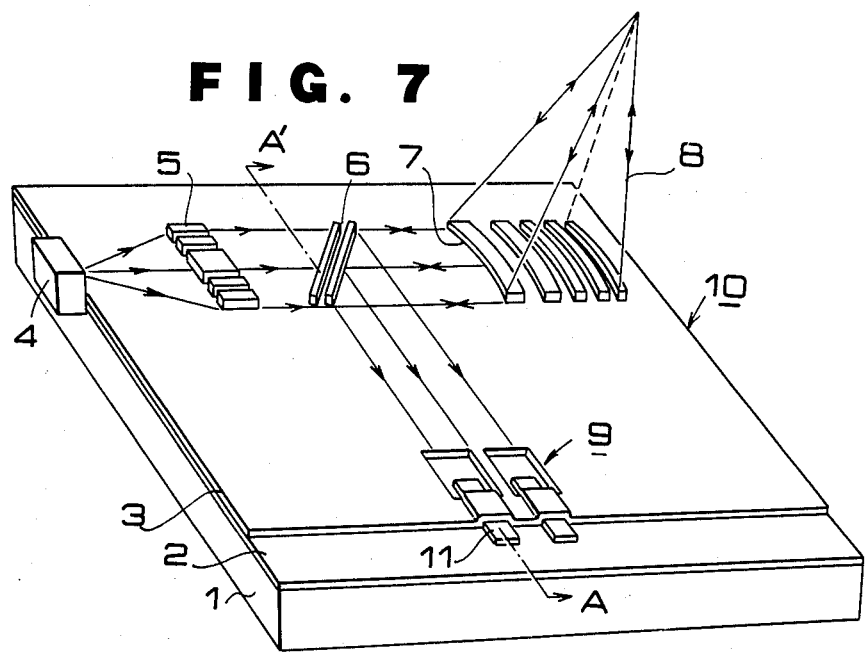
FIG. 7 is a perspective view of an optical head assembly according to another embodiment of the present invention.

Referring now to FIG. 7, there is illustrated another embodiment of the present invention, in which a photo detector 9 is formed in a substrate 1 in accordance with a semiconductor process. FIG. 8 is a sectional view for explaining this embodiment. The substrate 1 is formed of a semiconductor material, e.g. P-type single crystal silicon. A buffer layer 2 is formed by heating in an oxidative atmosphere, for example. The buffer layer portion corresponding to the photo detector is removed by photolithography and etching, then n-type impurity is diffused to form n+ diffused layer, and after mounting electrodes 11, optical IC components such as a dielectric thin film light conducting layer 3 and a beam splitter 6 are formed. In the optical head assembly thus fabricated, collimator lens 5, beam splitter 6, converging grating coupler 7 and photo detector 9 are formed by such method as photolithography, electron beam drawing or etching. Therefore, these components are positioned accurately with each other and it becomes unnecessary to make a positional adjustment after assembly.

Figure 9:
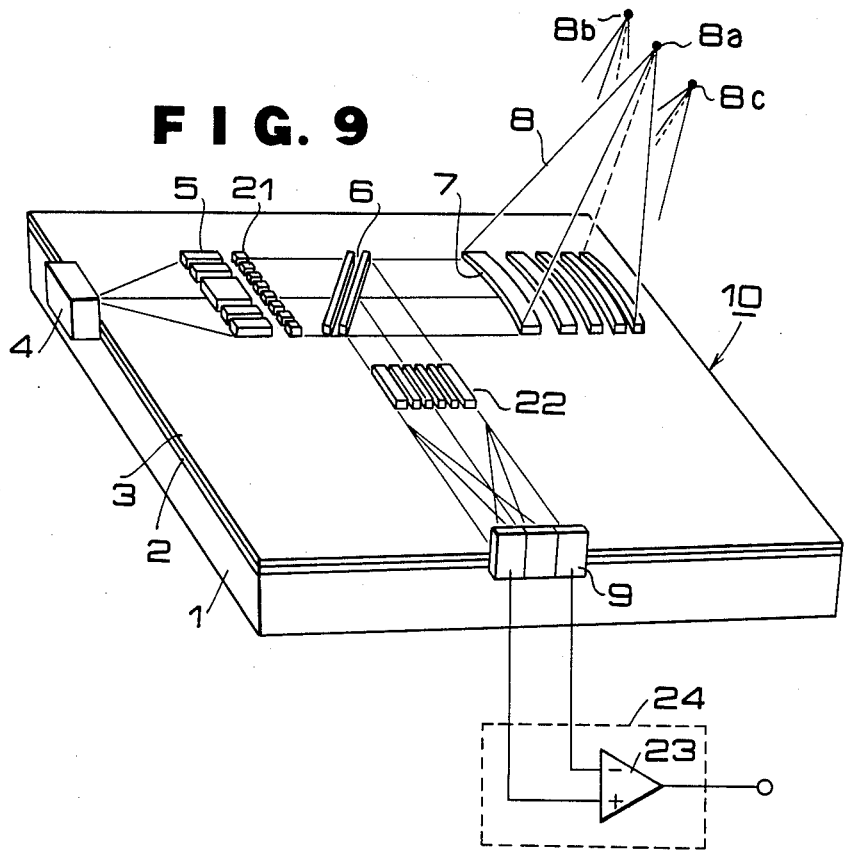
FIG. 9 is a perspective view of an optical head assembly according to a further embodiment of the present invention.

Referring now to FIG. 9, there is illustrated an optical head assembly according to a further embodiment of the present invention, in which portions corresponding to those shown in FIG. 5 are indicated by the same reference numerals. In this embodiment, a diffraction grating 21 is disposed between a collimator lens 5 and a beam splitter 6, and a sensor lens 22 is disposed between the beam splitter 6 and a photo detector 9. The photo detector 9 has three elements corresponding to three focused spots indicated by the reference numerals 8a, 8b and 8c. Outputs of two elements corresponding to the focused spots 8b and 8c are fed to a signal processing circuit 24 which comprises a differential amplifier 23.

Integration of optical components on a dielectric thin film light conducting layer 3 can be effected by a known method.

Figure 10:
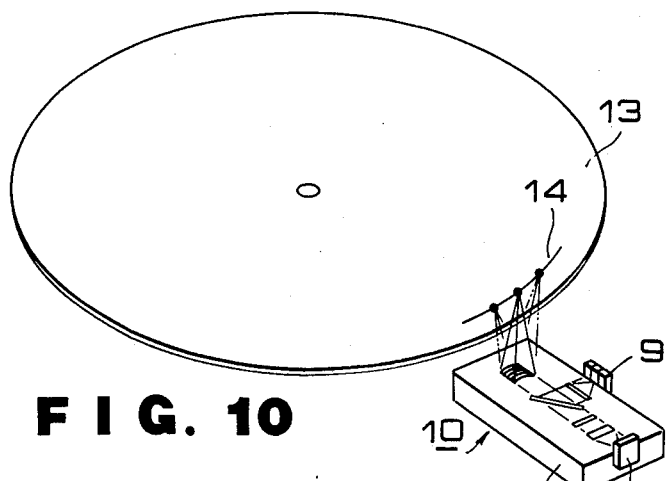

FIG. 10 shows a positional relation of the thusconstructed optical head assembly 10 to an optical disc 13. As is clear from FIGS. 11(a) and 11(b) which shows the relation more precisely, the optical head assembly 10 is disposed so that all of the three focused spots 8a, 8b and 8c are positioned on a phantom straight line L2 [FIG. 11(b)] extending along a track 14 of the optical disc 13.

Figure 11A:
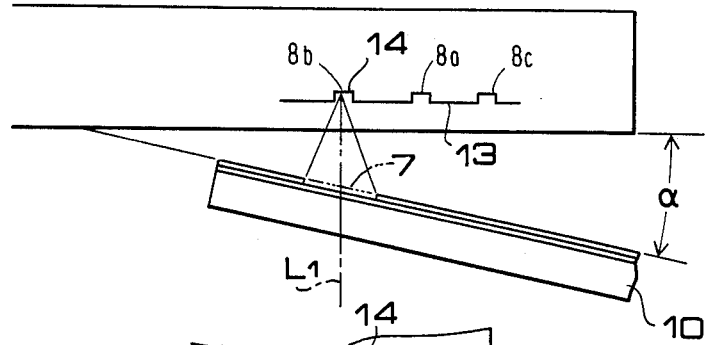
FIGS. 11(a) and (b) illustrate a relation between an optical IC used in the apparatus of FIG. 9 and track.

Further, a substrate 10 is tilted by an angle of α relative to the information recorded surface of the recording medium 13 so that a straight line L1 (to be exact, a line perpendicular to the wave front in the position of a focused spot of zero order beam) in FIG. 11(a) joining a focused spot 8a of zero order beam and the center of the converging grating coupler 7 becomes perpendicular to the information recorded surface on a track 14.

Figure 4:
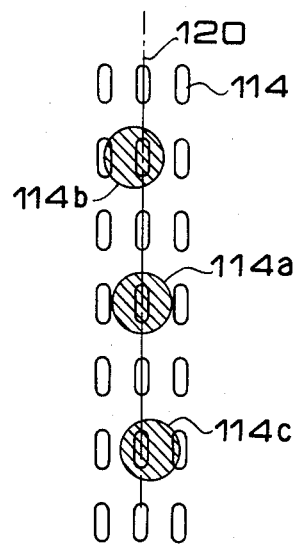
FIG. 4 illustrates three beam spots formed on a track of an optical disc in the apparatus of FIG. 3.
Figure 11B:
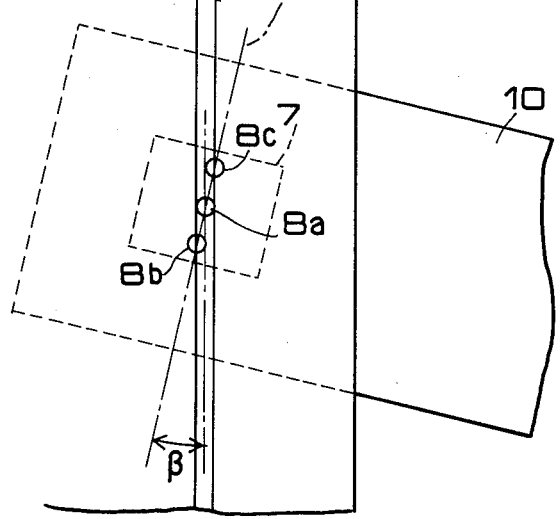

Further, the focused spots 8a, 8b and 8c are disposed inclinedly with respect to the track 14 as in FIG. 11(b) by making rotation by an angle of β around the straight line L1 or a straight line parallel thereto (not shown). That is, a similar state to FIG. 4 is created.

Such a mounting state is attained by attaching a known adjusting means to the substrate 10, thereby making adjustment and fixing to the adjusted state.

The following description is now provided about the operation of this embodiment.

Light beam emitted from the laser diode 4 is collimated through the collimator lens 5 and is then divided into plural beams by the diffraction grating 21. The beams then pass through the beam splitter 6 and are focused at every order of beam by the converging grating coupler 7 to form focused spots 8a, 8b and 8c of one zero order beam and two first order beams on the track 14 of the recording medium.

At this time, aberration at the focused spots is minimized because the substrate 10 of the optical IC formed with those optical components is mounted in such a manner as explained in connection with FIG. 11.

Deviation of the focused spots 14b and 14c of the two first order beams from the track 14 can be avoided because the straight line L1 joining the focused spot 14a of the zero order beam and the center of the converging grating coupler 7 is disposed perpendicularly to the track in advance.

Consequently, an accurate tracking sensor function can be attained according to the three-beam method. More specifically, the light beams reflected by the track 14 pass through the converging grating coupler 7 and are bent toward the sensor lens 22 by the beam splitter 6. The zero order and first order beams which have passed through the lens 22 are incident on the photo detector 9 and thereby converted to electrical signals. As to the signals corresponding to the first order beams, a difference therebetween is amplified by the differential amplifier 23 as previously noted. But, because of no deviation of focused spots from the track, the amplifier 23 can provide such an output signal as FIG. 2(e) always accurately.

The present invention also aims at providing an optical head assembly having a tracking sensor means based on a method different from the above-described embodiments.

FIG. 12 illustrates a schematic construction of a tracking sensor portion of an optical head assembly already known, in which the numeral 121 denotes a semiconductor laser, the numeral 122 denotes a collimator lens, numeral 123 a beam splitter, numeral 124 an oscillating mirror adapted to pivot slightly in the direction of arrow C, numeral 125 a deflecting mirror adapted to rotate in the direction of arrow D, numeral 126 an objective lens, numeral 127 an optical disc, numeral 128 an information track on the optical disc 127. Further, the numeral 129 denotes a photo detector which receives a reflected beam after reading information from the information track 128 and provides an electrical signal corresponding to the read information. The numeral 130 denotes an electric signal terminal of the photo detector 129, numeral 131 an oscillator, numeral 132 a low-pass filter which serves as an envelope detector. Numeral 133 denotes a phase detector which detects the phase of the output of low-pass filter 132 on the basis of the output of the oscillator 131. Numeral 134 denotes a low-pass filter, and numeral 135 denotes an amplifier which receives an output signal from the low-pass filter 134 and provides a signal for driving the deflecting mirror 125 in accordance with the polarity of the said output signal.

The conventional optical head assembly having the above construction operates as follows. Beam emitted from the semiconductor laser 121 becomes a collimated beam through the collimator lens 122, then passes through the beam splitter 123 and is reflected by the oscillating mirror 124 and the deflecting mirror 125, then focused on the optical disc 127 by the objective lens 126. The optical disc 127 is rotated by a motor (not shown) and the beam focused on the information track 128 undergoes a modulation according to the contents of information recorded on the track and is reflected. This reflected beam goes back along the optical path, passes through the objective lens 126 and is reflected by the deflecting mirror 125 and the oscillating mirror 124, then its advancing direction is turned 90° by the beam splitter 123, then the beam is incident on the photo detector 129 and thereby converted to an electric signal. This electric signal is provided as a playback signal from the output terminal 130 and is used for various purposes.

Figure 14:
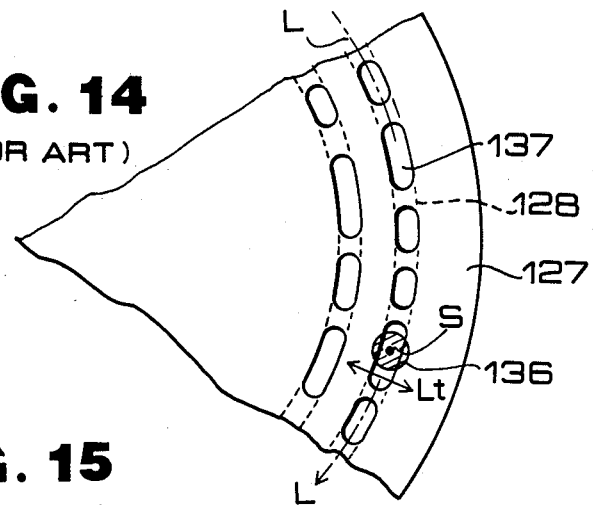
FIG. 14 illustrates a relation between track and beam spot.

The electric signal obtained from the output terminal 130 is also used for controlling a focused spot of reading beam during tracing for the information track 128. FIG. 14 is a partial plan view showing in what state the focused spot of reading beam is on the optical disc 127. As shown, there are a string of long and short pits 137 along the track 128, and a focused spot 136 oscillates in a direction perpendicular to the track 128 as indicated by Lt in the figure under the action of the oscillating mirror 124 which is oscillated minutely by the oscillator 131.

FIGS. 13(a) to 13(f) are illustrative of tracing controlling operations for the track 128 using the oscillation of the focused spot 136, of which (a) to (c) show three traces of different centers S (see FIG. 14) of the focused spot 136 relative to a central line L (see FIG. 14) of the track 128, while (d) to (f) show output waveforms of the low-pass filter 132 corresponding to the (a) to (c) cases. Information is read while allowing the focused spot 136 to oscillate slightly in the direction intersecting the track 128 as described above, whereby in the output of the photo detector 129 through the low-pass filter 132 there can be detected a direction of deviation from the central line L, as phases of signals (d) and (f) (180° out of phase with each other relative to the output of the oscillator 131), and the magnitude of deviation is detected as a signal amplitude in FIG. 13. More specifically, the playback signal obtained from the photo detector 129 is subjected to detection through the low-pass filter 132 which acts as an envelope detector, whereby there are obtained such outputs as shown in FIGS. 13(d) to 13(f). In FIG. 13, when the focused spot 136 is in exact alignment with the central line L of the track 128 having pits 137, this state corresponds to that shown in FIG. 13(b), so that the output signal comes to have a double frequency component of the oscillation frequency of the focused spot 136, namely, a double frequency component of the oscillation frequency of the oscillator 131 [FIG. 13(e)].

Figure 15:
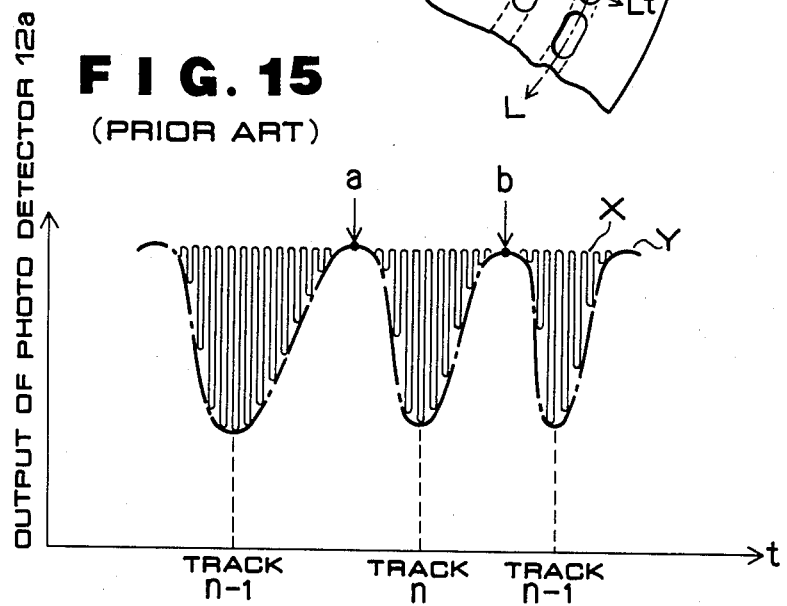
FIG. 15 illustrates waveforms of output signals provided from a photo detector used in the apparatus of FIG. 12.
Figure 16:
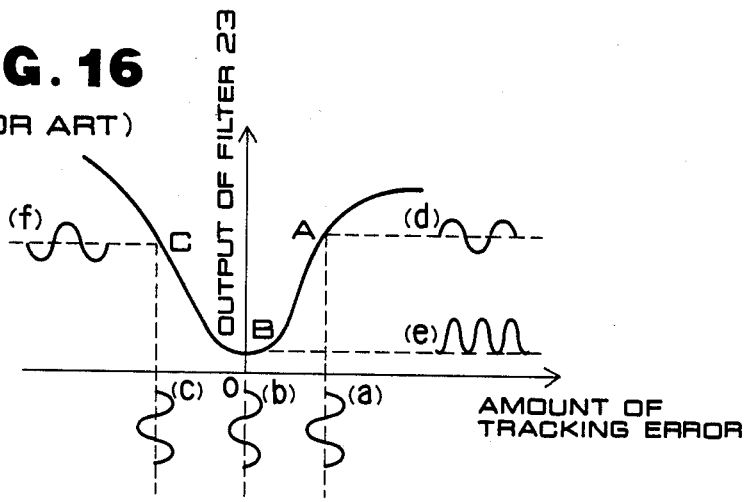
FIG. 16 is a graph showing a relation between the amount of tracking error and filter output in the apparatus of FIG. 12.

The principle of generation of the signals shown in FIGS. 13(d) to 13(f) will now be explained in more detail with reference to FIGS. 15 and 16. FIG. 15 shows output waveforms provided from the photo detector 129 when the beam spot 136 crosses three tracks n−1, n and n+1 on the disc 127 which is rotating eccentrically in one direction at a predetermined speed. As shown, the output signal comprises a high frequency component (corresponding to the information signal stored in the disc) indicated by "x" and an envelope indicated by an alternate long and short dash line of "y". The high frequency component "x" is not contained in intermediate points "a" and "b" between tracks. As can be seen from this figure, the amplitude of the high frequency signal "x" becomes maximum when the center of the spot 136 coincides with the track center. At this time, therefore, the envelope "y" takes a parabolic extreme value. By passing such output signal as FIG. 15 through the low-pass filter 132 in FIG. 12 to remove the high frequency component "x" therefrom, it is made possible to take out such envelope signal as in FIG. 16. In FIG. 16, an origin 0 represents the center of track n, and the output of the low-pass filter 132 corresponding to the envelope "y" is plotted along the axis of ordinate. If the minute oscillation frequency of the mirror 124 is set below the cut-off frequency of the low-pass filter 132, such modulations as shown in FIGS. 16(a), (b) and (c) are applied to tracking error points A, B and C, resulting in that such outputs as (d), (e) and (f) are superimposed on the output of the low-pass filter 132.

More specifically, at symmetric tracking error points A and C there are obtained outputs (d) and (f) having the original mirror oscillation frequency and phases opposite to each other, while at point B corresponding to track coincidence, there is obtained a signal (e) having a frequency component which doubles the mirror oscillation frequency. These signals (d), (e) and (f) correspond to the signals (d), (e) and (f) shown previously in FIG. 13. The output of the low-pass filter having the above characteristic is detected by the phase detector 133 having a multiplication function, on the basis of the output of the oscillator 131, and then passed through the low-pass filter to obtain a DC output corresponding to the above deviation.

Figure 17:
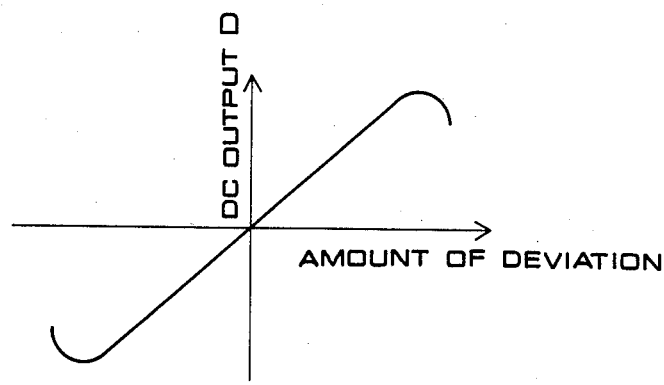
FIG. 17 is a graph showing a relation between the amount of deviation and DC output in the apparatus of FIG. 12.

FIG. 17 is a characteristic diagram showing the relation of the DC output D of the low-pass filter 134 to a deviation $\Delta$ of the oscillation center S of the focused spot 136 from the center of the track 128. This characteristic is known to exhibit a good linearity in a practical range. If the DC output D is amplified by the amplifier 135 and the deflecting mirror 125 is driven negative-feedbackwise by the output of the amplifier, it is possible to let the focused spot 136 trace along the center L of the track 128.

Figure 18:
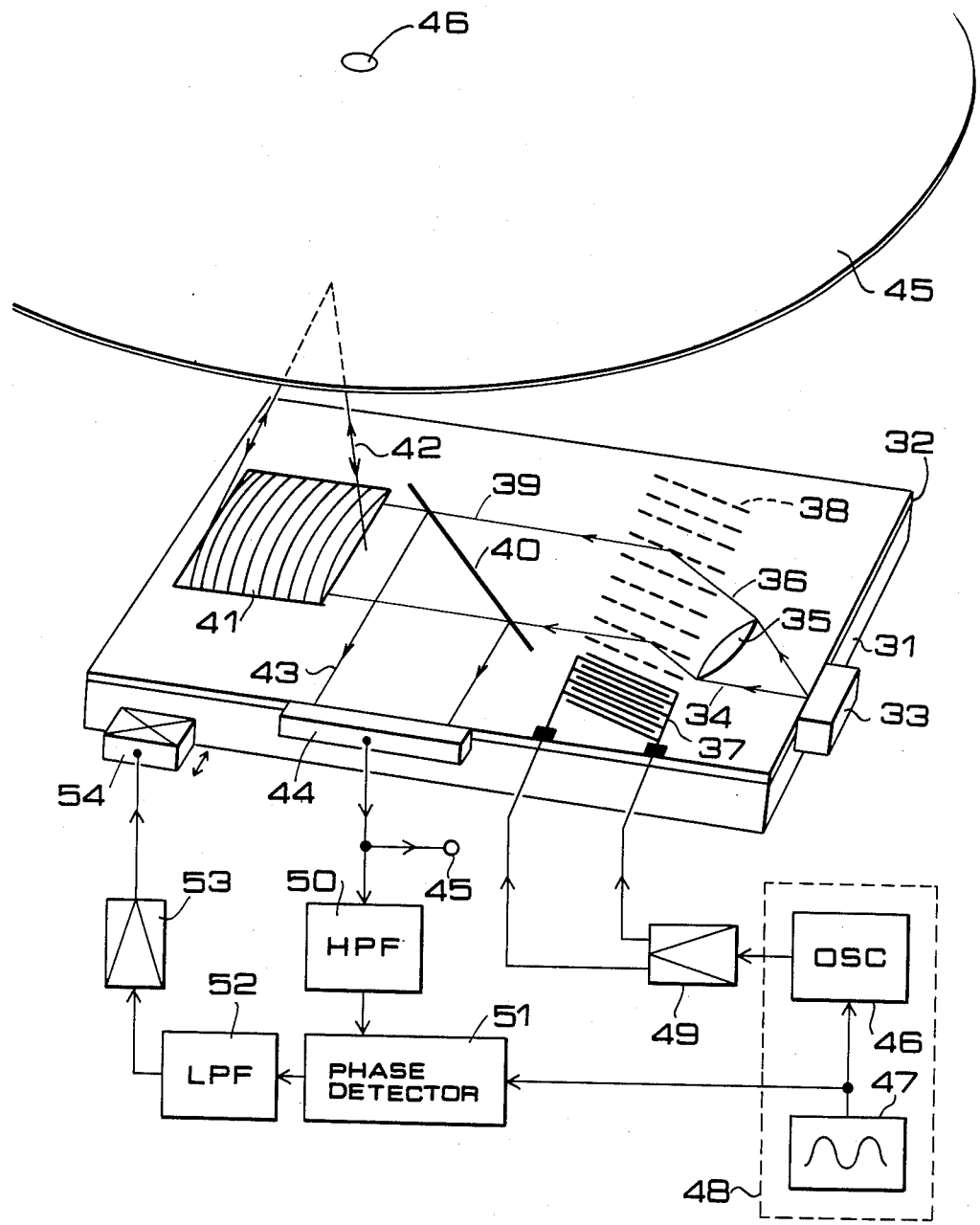
FIG. 18 illustrates an optical head assembly including a surface acoustic wave generating means according to a further embodiment of the present invention.

Referring now to FIG. 18, there is illustrated an optical head assembly based on the above principle according to the present invention, in which the numeral 31 denotes a substrate having an elastic optical effect, which is formed of LiNbO$_3$ (lithium niobate), and the numeral 32 denotes a light conducting layer formed by a thin film on the surface of the substrate 31. In the case of a LiNbO$_3$ substrate, the light conducting layer 32 is formed by forming titanium film on an optically polished substrate surface to a thickness of several hundred angstrom by sputtering or electron beam evaporation, followed by heat diffusion. The numeral 33 denotes a semiconductor laser chip (LD) mounted on an end face of the light conducting layer 32. Emitted light beam 34 is propagated through the light conducting layer 32. The numeral 35 denotes a collimator lens formed on the light conducting layer 32 and the numeral 36 denotes a guided beam collimated by the lens 35.

The numeral 37 denotes a comb-like electrode of interdigital transducer formed on the light conducting layer 32 by patterning of metal such as aluminum (Al) or (Au), for example. A surface acoustic wave 38 is generated on the light conducting layer by applying a high frequency signal to the electrode 37. The numeral 39 denotes a collimated beam which has been Bragg-deflected by the surface acoustic wave 38; numeral 40 denotes a beam splitter constituted on the light conducting layer 32; numeral 41 denotes a converging type grating coupler constituted on the light conducting layer 32 for changing the collimated guided beam 39 into a focused beam 42 which advances in a direction crossing the conducting layer surface; numeral 45 denotes an optical disc as an information recording medium; and numeral 46 denotes a central hole of the optical disc 45, which is rotated about this hole by a motor (not shown). The numeral 43 denotes a beam obtained by separation from the beam 39 by the beam splitter 40 after being modulated by the information surface of the disc 45, then reflected and again collimated by the grating coupler 41. Numeral 44 denotes a photo detector which receives the beam 43; numeral 45 denotes an output terminal of the photo detector; and numeral 46 denotes an oscillator which constitutes a frequency sweep oscillator 48 together with a sweep signal generator 47. The oscillation frequency of the oscillator 46 is varied by the output of the sweep signal generator 47. Numeral 49 denotes an amplifier which amplifies the output of the oscillator 46 and applies the amplified output to the comb-like electrode 37; numeral 50 denotes a high-pass filter which receives a high frequency signal from the photo detector; numeral 51 denotes a phase detector for detecting the phase of the output of the high-pass filter 50 which serves as an envelope detector, on the basis of the output of the sweep signal generator 47; numeral 52 denotes a low-pass filter (LPF) which receives the output of the detector 51; numeral 53 denotes an amplifier for amplifying the output of the LPF 52; and numeral 54 denotes an actuator for driving the substrate 31 in a direction perpendicular to the direction of track on the disc 45 in accordance with the output of the amplifier 53.

The optical head assembly of this embodiment having the above-described construction operates as follows. Light beam emitted from the semiconductor laser chip 33 is collimated by the collimator lens 35. This thin-film lens or collimator lens 35 on the light conducting layer utilizes changes of an effective refractive index caused by changes in thickness of the thin-film light conducting layer as already known, for example. In short, the lens 35 is a means for changing the emitted light beam 34 into a collimated beam 36, and it may be replaced by any other suitable means having the same function.

The conducted beam 36 which has been collimated by the lens 35 is Bragg-diffracted into a diffracted beam 39 by the effect of a sinusoidal change of refractive index based on an elastic optical effect caused by the surface acoustic wave (SAW) 38 which is generated on the surface of the light conducting layer 32.

Figure 19:
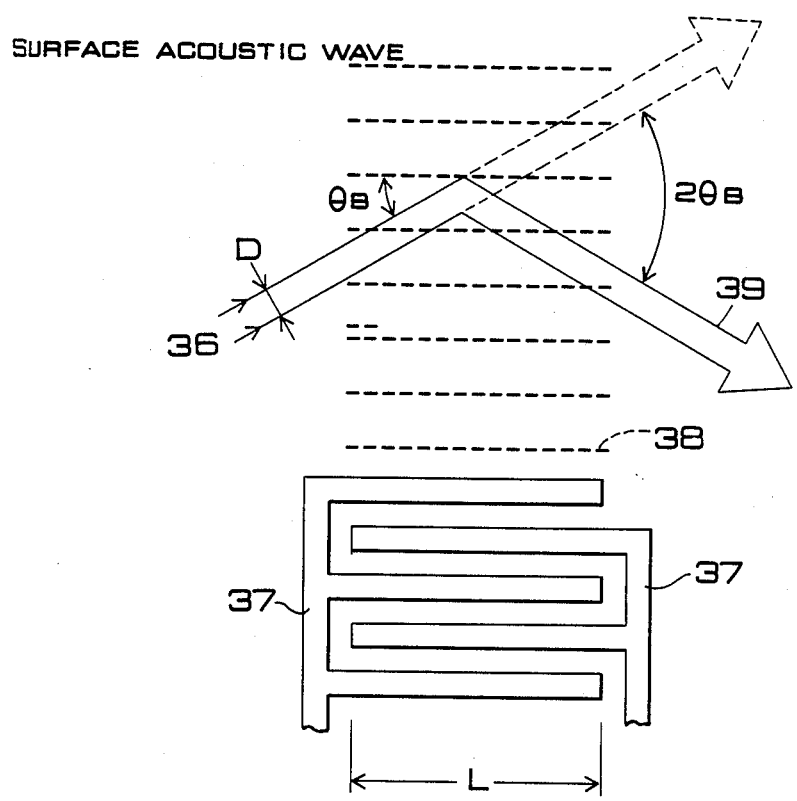
FIG. 19 illustrates an effect of a surface acoustic wave on a beam advancing direction.

The principle of this diffraction will now be explained in detail with reference to FIG. 19. When the collimated beam 36 is incident at a Bragg angle $\theta_B$ relative to the surface acoustic wave 38 which is emitted from the comb-like electrode 37, the laser beam is diffracted in a direction $\theta_B$ in which the following condition is satisfied:

$$\sin \theta_B = \lambda/2n\Lambda_u \qquad (1)$$

where, $\lambda$: wave length of the laser beam $\Lambda_u$: wave length of the surface acoustic wave n : effective refractive index of the light conducting layer And its advancing direction changes by $2\theta_B$. It is possible to sweep the angle of deflection electrically by sweeping the high frequency applied to the comb-like electrode in the vicinity of the frequency of ultrasonic wave which satisfies the above equation (1). In order to deflect the beam under utilization of such deflection by the surface acoustic wave 38, it is necessary to use a substrate having a large photoelastic constant. In this connection, the LiNbO$_3$ crystals used in this embodiment are known to exhibit an excellent photoelastic effect.

The sweep speed in such elastooptic light deflection will now be estimated. As a factor for determining an operating speed of such light deflector, there is considered time $\tau$ which permits a uniform surface acoustic wave distribution in the section of light wave beam. If the incident beam diameter is D as in FIG. 19 and the propagation speed of surface acoustic wave on the substrate is $v_a$:

$$\tau = D/v_a \quad (2)$$

For example, if D=5 mm, then in the case of LiNbO$_3$, $v_a$ is about $6.6 \times 10^3$ m/sec, so $\tau \approx 0.75$ μs, and thus it is apparent that a high speed sweep above 1 MHz is feasible. It goes without saying that by lowering the sweep frequency of the oscillator 48 it is possible to sweep the beam at a frequency (several ten kHz or more) similar to the mechanical oscillation of mirrors in the prior art.

In FIG. 18, the sweep-deflected beam 39 is incident on the beam splitter 40. The beam splitter 40 can be constituted, for example, by forming a μm order of groove in the light conducting layer. Any other method is adoptable if only the resultant beam splitter can separate the incident beam 39 from the beam 43 reflected by the disc. The beam which has passed through the beam splitter 40 is incident on the converging type grating coupler 41 formed on the surface of the light conducting path, whereby the beam is converged upward from the light conducting layer as indicated at 42. In such converging type grating coupler (diffraction grating lens), the phase of diffraction grating is given as a phase difference between incident beam and diffracted beam (focused beam), and the coupler can be formed by determining the shape of diffraction line through calculation and utilizing an electron beam drawing method. The beam spot formed by the beam 42 converged on the disc 45 oscillates minutely like the prior art because its angle of incidence on the grating coupler 41 is swept minutely in the light conducting layer surface. And a positional relation between the substrate 31 and the disc 45 is determined so that the direction of the oscillation is perpendicular to the track. In this way, the beam component which has been reflected by the disc 45 and again converted to a guided beam by the grating coupler 41 is separated from the incident beam 39 by the beam splitter 40 and becomes a guided beam 43, which is incident on the photo detector 44 mounted on an end face of the light conducting path and thereby converted to an electrical signal.

The phase detector 51, LPF 52 and amplifier 53 operate like conventional ones except the following modifications. First, a reference input of the phase detector 51 is connected to the output of the sweep signal generator 47. This is because the sweep signal generator 47 in this embodiment has the function of producing an output corresponding to the mirror oscillating oscillator 131 in FIG. 12 which illustrates the prior art, that is, producing a deflection angle sweeping signal. A second modification is that the low-pass filter 132 in FIG. 12 which illustrates the prior art is replaced by the high-pass filter 50 in the embodiment of the present invention. More particularly, the light deflector which utilizes the photoelastic effect in the optical head of the present invention can effect light deflection at a high speed of 1 MHz or more as previously noted, so sweep is made at a frequency higher than that of the information stored in the disc, and a sweep frequency spectrum component which is generated in the read signal by the minute oscillation of the beam spot is set to have a frequency higher than that of the disc information. Therefore, in order to obtain a signal containing tracking error data such as those shown in FIGS. 13(d) to (f) from the read signal, it is necessary to use the high-pass filter 50 having such attenuation characteristics as cut only disc information, and connect it to the input terminal of the phase detector 51. It goes without saying that where the minute oscillation is made at a lower frequency than the disc information and spectral component, the high-pass filter may be replaced by a low-pass filter to cut the disc information component.

In the optical head assembly of the present invention having the above construction, as will be seen from the explanation made hereinbefore, a tracking error signal (see FIG. 17) can be detected by oscillating a focused spot minutely on a disc surface track in accordance with the same principle as that explained in connection with the prior art, and a deviation of the beam spot center from the track can be corrected by driving the actuator 54 negative-feedbackwise through the amplifier 53 to move the entirety of the substrate 31.

Referring now to FIG. 20, there is illustrated a still further embodiment of the present invention, in which the same portions as in FIG. 18 are indicated by the same reference numerals. This embodiment is different from that shown in FIG. 18 in that the output of the LPF 52 is applied to a terminal 55 of the sweep signal generator, the actuator 54 in FIG. 18 being omitted. The terminal 55 is an input terminal for changing the offset of the sweep signal generator 47. When an output signal from the filter is applied to the input terminal 55, the offset of a sweep signal connected to the oscillator 46 changes and so the sweep center frequency of the frequency sweep oscillator 48 changes, thus causing a change of the oscillation center of the beam spot on the disc.

In such construction, a tracking error detection signal as the output of the LPF 52 is fed back negatively to the terminal 55, whereby not only track detection but also correction of a central position of the beam spot relative to track displacement can be attained purely electrically without using a mechanical means. Where the oscillation of the beam spot is performed at a lower frequency that the disc information spectral band, the high-pass filter 50 may be replaced by a low-pass filter, and this is the same as in the embodiment illustrated in FIG. 18.

According to the present invention, there is further provided an optical head assembly having a focus sensor function in addition to the foregoing tracking sensor function.

Figures 21, 21A, 21B, 21C:
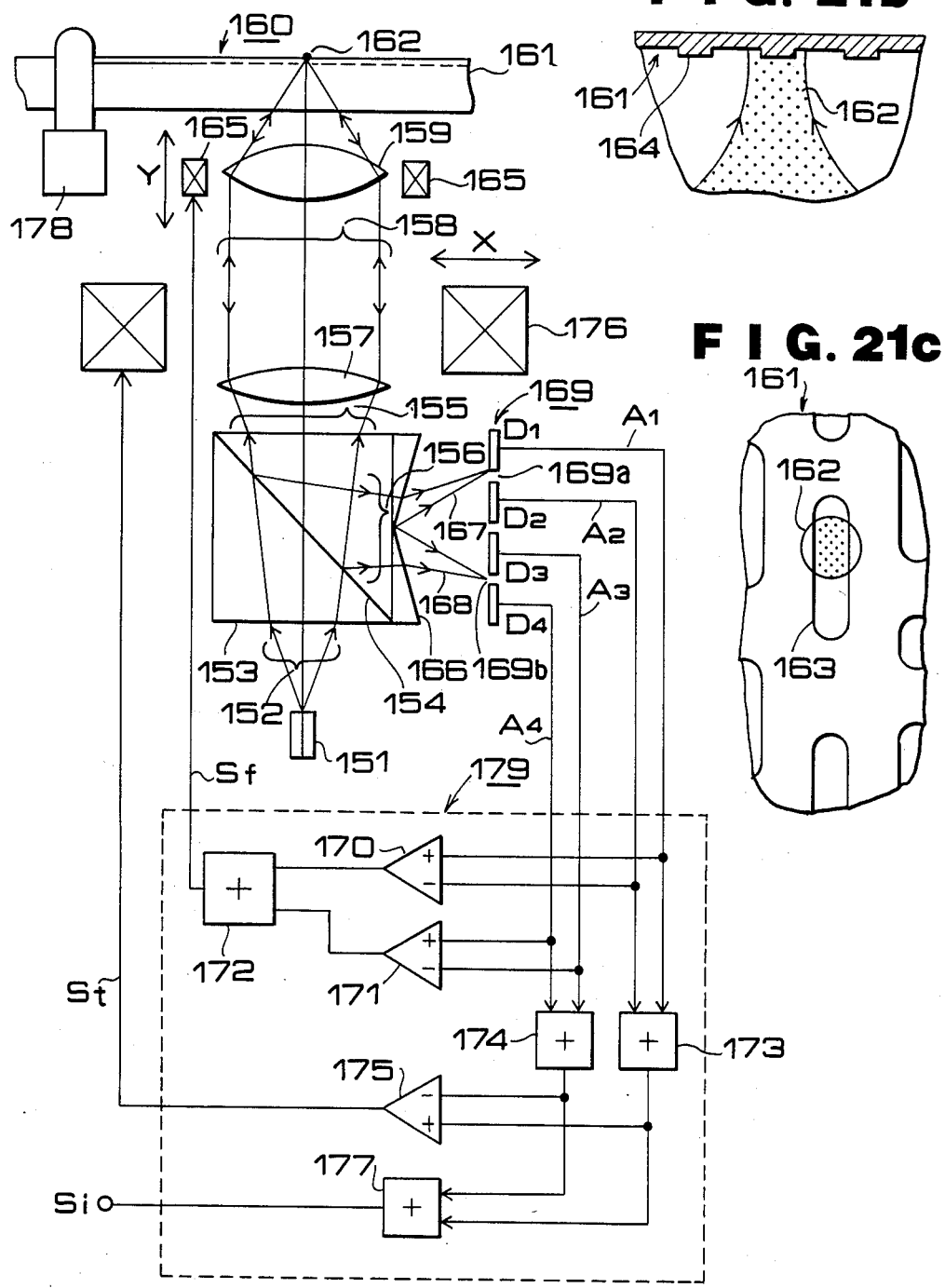
FIG. 21(a) illustrates a conventional optical head assembly having both a tracking function and an automatic focusing function.
FIGS. 21(b) and 21(c) are a sectional view and a plan view, respectively, showing a relation between track and beam spot.

An optical sensor having both tracking sensor function and focus sensor function is described, for example, in the "Philips Technical Review", Vol. 40, No. 6 (1982), p. 150. This known optical sensor is of such a structure as shown in FIG. 21. In FIGS. 21(a), (b) and (c), the numeral 151 denotes a semiconductor laser; numeral 152 denotes a beam emitted from the semiconductor laser 151; numeral 153 denotes a beam splitter for separating a reflected beam 156 from emitted beam 155 at its reflection surface 154; numeral 157 denotes a collimator lens for changing the emitted beam 155 to a collimated beam 158; numeral 159 denotes an objective lens for converging the collimated beam 158 as a beam spot 162 on an information surface of an optical disc 160; numeral 163 denotes a pit as an information unit formed on the information surface 161, the pit 163 being, for example, 0.4–0.5 μm wide, 2–4 μm long and about 0.1 μm deep. Numeral 164 denotes an information track with pits 163 arranged in series; numeral 165 denotes a focusing actuator which moves the objective lens 159 in a direction Y perpendicular to the information surface to let a focal position of the objective lens coincide with the information surface 161 (this state will hereinafter be referred to as "in-focus" state) in accordance with a signal (hereinafter referred to as "focusing error signal") indicative of a deviation of the information surface 161 from the focal position of the objective lens. Numeral 166 denotes a wedge prism for dividing the reflected beam 156 into two beams 167 and 168, and numeral 169 denotes a photo detector comprising two photo detectors 169a and 169b which are constituted respectively by two elements $D_1$, $D_2$ and two elements $D_3$, $D_4$, the spacing of $D_1$ and $D_2$ and that of $D_3$ and $D_4$ being each 5 to 10 μm. The reference marks $A_1$, $A_2$, $A_3$ and $A_4$ denote outputs of the four elements $D_1$, $D_2$, $D_3$ and $D_4$, respectively, of the photo detector 169.

Numeral 170 denotes a differential amplifier for calculating $A_1-A_2$; numeral 171 denotes a differential amplifier also for calculating $A_4-A_3$; numeral 172 denotes an adder for adding the outputs of the differential amplifiers 170 and 171 and producing a focusing error signal $[(A_1+A_4)-(A_2+A_3)]$; and $S_f$ represents a signal proportional to the amount of focusing error which is the output of the adder 172. With this signal, the focusing actuator 165 is controlled so that the information surface 161 is located always in the "in-focus" position of the objective lens 159. Numeral 173 denotes an adder for calculating $(A_1+A_2)$ and numeral 175 denotes a differential amplifier for differential-amplifying the outputs of the adders 173 and 174 to thereby produce a signal (hereinafter referred to as "tracking error signal") $[(A_1+A_2)-(A_3+A_4)]$ indicative of a deviation between the information track 164 and the beam spot 162. Numeral 176 denotes a tracking actuator for moving the entirety of the reproducing optical system in a direction X perpendicular to the track, and $S_t$ represents a tracking error signal corresponding to the output of the differential amplifier 175. This signal is used to control the tracking actuator 176 so that the beam spot 162 is radiated onto the information track 164 continually.

Numeral 177 denotes an adder for adding the outputs of the adders 173 and 174, and its output Si is an electric signal obtained by reproducing information on the optical disc 160. By an information processing of Si there can be obtained a desired TV signal or audio signal. Numeral 178 denotes a motor for rotating the disc 160, and numeral 179 denotes a signal processing electronic circuit for obtaining the above signals $S_f$, $S_t$ and $S_i$.

Operation will now be described. The emitted beam 152 from the semiconductor laser 151 is converged to the information track 164 on the optical disc 160. Reflected beam which represents the information on the track 164 is again collimated by the objective lens 159, then becomes a convergent reflected beam 156 through the collimator lens 157 and divided into two beams 167 and 168 by the wedge prism 166.

In focused spots of the beams 167 and 168 are disposed the photo detectors 169a and 169b, respectively, which are bisplit type photo detectors. The signals $S_f$, $S_t$ and $S_i$ can be obtained on the basis of the outputs of the photo detectors 169a and 169b, and the focusing actuator 165 and the tracking actuator 176 are controlled in accordance with $S_f$ and $S_t$ serving as correction signals, thereby permitting correction of focusing error and tracking error.

The optical disc 160 undergoes a positional deviation (typically 300–500 μm) in the Y direction as it is rotated by the motor 178. On the other hand, the beam spot 162 formed through the objective lens 159 is 1–2 μm in size and the depth of focus thereof is of the order of 1–2 μm, so there will occur a focusing error with rotation of the disc. This focusing error as well as tracking error are corrected in the following manner.

FIG. 22 illustrates beams on the photo detectors 169a and 169b in the vicinity of the objective lens 159 in the case where the information surface 161 of the disc 160 is in the "in-focus" position [FIG. 22(b)] and also in the cases where it deviates forward and backward from the "in-focus" position [FIGS. 22(a) and (c)]. When the information surface 161 of the disc 160 is in the "in-focus" position (hereinafter referred to as "in-focus state"), the beams on the photo detector located at a converged point of reflected beam are as shown in FIG. 22(b). In this case, the photo detectors 169a and 169b are disposed so that the beam incident on $D_1$ and $D_2$ and that incident on $D_3$ and $D_4$ become equal in intensity. On the other hand, when the information surface 161 on the disc 160 deviate forward or backward from the in-focus position, the beams on the photo detectors 169a and 169b are as shown in FIGS. 22(a) and (c). Consequently, the output $S_f$ of the adder 172 becomes like that shown in FIG. 23 relative to focusing error, and thus with the output $S_f$ the focusing actuator 165 can be controlled to correct a focusing error of the objective lens continually as well known.

The center of the optical disc 160 is in many cases not coincident with the center of rotation due to a mounting error or the like, thus causing a tracking error with rotation. FIGS. 24(a), (b) and (c) show reflected beam intensities in positions just after the wedge prism 166 in the case where the beam spot adjacent the focus of the objective lens is on the center of the information track 164 [FIG. 24(a)] and also in the case where it is deviated from the track center [FIGS. 24(b) and (c)]. When the beam spot 162 is on the center of the track 164 as in FIG. 24(a) (hereinafter referred to as "on-track state"), the beam distribution just after the wedge prism 166 become symmetric in a transverse direction crossing the bisplit photo detectors 169a and 169b. On the other hand, when the beam spot 162 is formed in positions deviated from the center of the track 164 as shown in FIGS. 24(b) and (c), the beam distribution just after the wedge prism 166 become asymmetric in the said transverse direction, and the beam distribution in the transverse direction differs depending on in which direction the beam spot 162 deviates from the track 164. Consequently, the output $S_t$ of the differential amplifier 175 varies as in FIG. 25 according to deviations (hereinafter referred to as "tracking error") of the beam spot 162 from the track 164, so with this output $S_f$ the tracking actuator 176 can be controlled to maintain the beam spot 161 162 in the in-track state as well known.

Since the conventional optical information recording/reproducing system is constructed as above, it is necessary to use an optical system comprising a plurality of optical components such as lenses in order to attain such functions as light converging, in-focus state detection and tracking detection, and it is not easy to adjust this optical system.

In the present invention, optical components are formed monolithically on a single substrate whereby a light converging mechanism, a signal detecting mechanism, a focus sensor and a tracking sensor can be constituted, thus eliminating the need of optical system adjustment and permitting a remarkable reduction of the number of optical parts used.

Referring now to FIGS. 26(a) and (b), there is illustrated a further embodiment of the present invention, in which the same portions as in FIG. 21 are indicated by the same reference numerals. The numeral 60 denotes a silicon (Si) substrate; numeral 61 denotes an $SiO_2$ film of 1–2 $\mu$m thickness formed on the silicon substrate; and numeral 62 denotes a thin film light conducting layer of 0.5–2 $\mu$m thickness formed on the $SiO_2$ film, the light conducting layer 62 being formed of #7059 glass (a product of Corning Glass Works), for example. A semiconductor laser 59 is coupled to the light conducting layer 62 so that beam emitted therefrom is incident on the same path, which beam is propagated through the thin film. Numeral 63 denotes a diffused beam injected from the semiconductor laser 59 into the light conducting path; numeral 64 denotes a grating-like collimating element for collimating the diverging beam 63 into a collimated beam 65, the collimating element 64 comprising a 0.01–0.2 $\mu$m thick SiN film. Further, numeral 66 denotes a grating-like beam splitting element for separating a reflected beam 68 after reading information on the disc 160 from beam 67 radiated to a disc 160, the beam splitting element 66 comprising a 0.01–0.2 $\mu$m thick SiN film. Numeral 69 denotes a converging type grating coupler for converging the radiated beam 67 to a beam spot 162, the grating coupler 69 comprising a 0.01–0.2 $\mu$m thick film. Numeral 70 denotes a grating type beam dividing/converging element for dividing the reflected beam 48 into two beams and converging the two beams to separate spots, the beam dividing-/converging element 70 comprisisng a 0.01–0.2 $\mu$m thick SiN film.

In the optical head assembly having the above construction, the light from the semiconductor laser 59 is emitted as the diverging beam 63, which then becomes the collimated beam 65 through the collimating element 64. The collimated beam 65 passes through the beam splitting element 66 and becomes the irradiation beam 67, which in turn is converged to the beam spot 162 by the grating coupler 69.

The reflected beam after reading information from the information surface 161 again becomes a collimated beam through the grating coupler 69 and is propagated through the light conducting layer 62, then is separated from the beam 65 by the beam splitting element 66 and becomes the reflected beam 68. The reflected beam 68 is divided and converged into two beams 71a and 71b by the beam dividing/converging element 70, which beams are incident on photo detectors 169a and 169b. The photo detectors 169a and 169b are located in focused positions of the beams 71a and 71b when the information surface 161 coincides with the focus position of the grating coupler 69, so that the intensity of beam incident on detecting elements $D_1$ and $D_2$ and that of beam incident on detecting elements $D_3$ and $D_4$ are equal to each other.

Figure 27A:
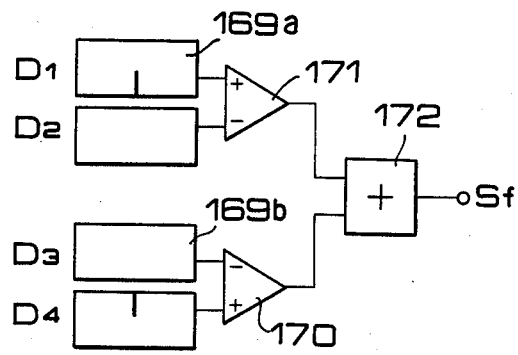
FIGS. 27(a) to 27(c) illustrate changes in beam position on two light-receiving surfaces of a photo detector relative to deviations from focus position.
Figure 27B:
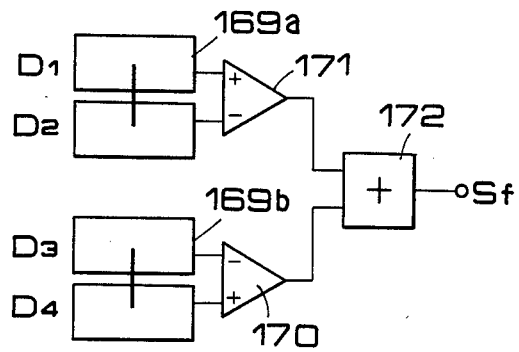
Figure 27C:
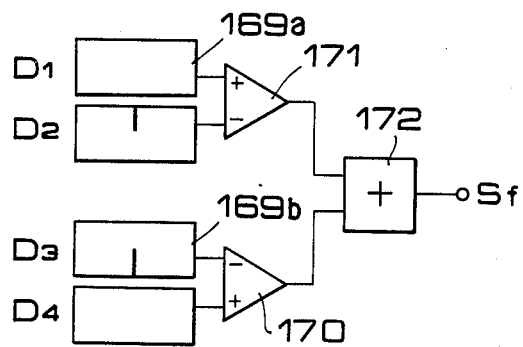

At this time, the beams on the photo detectors vary in such a shape as crushed in the direction of the partition line of the photo detectors 169a and 169b as in FIGS. 27(a) to (c) according to deviations from the in-focus position of the converging element 69. FIGS. 27(a) to (c) illustrate the case where the information surface has come nearer than the in-focus position, the case where it is in the in-focus position and the case where it has gone away from the in-focus position. Therefore, like the conventional apparatus, the output $S_f$ varies according to focusing errors as in FIG. 22 and it becomes possible to make a focus control.

Figure 25:
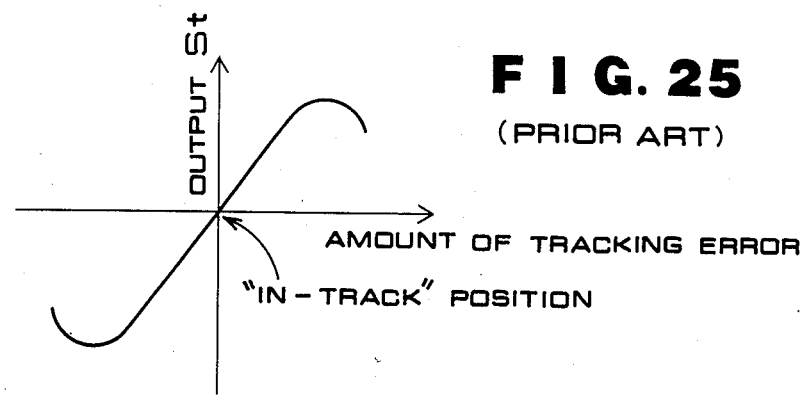
FIG. 25 is a graph showing a relation between the amount of tracking error and output St.

From the output $S_f$ there can be obtained the sensor characteristic shown in FIG. 25 on the basis of a similar principle to that of the conventional apparatus.

The collimating element 64, beam splitting element 66, grating coupler 69 and beam dividing/converging element 70 can be formed, for example, by forming a thin SiN film on the glass 62 by CDV (Chemical Vapour Deposition), applying an electron-beam resist coating, exposing it to electron beam so that the electron-beam resist remains on the portions of the above optical elements, and then sujecting the SiN film portion other than the optical element portion to plasma etching.

Figure 28A:
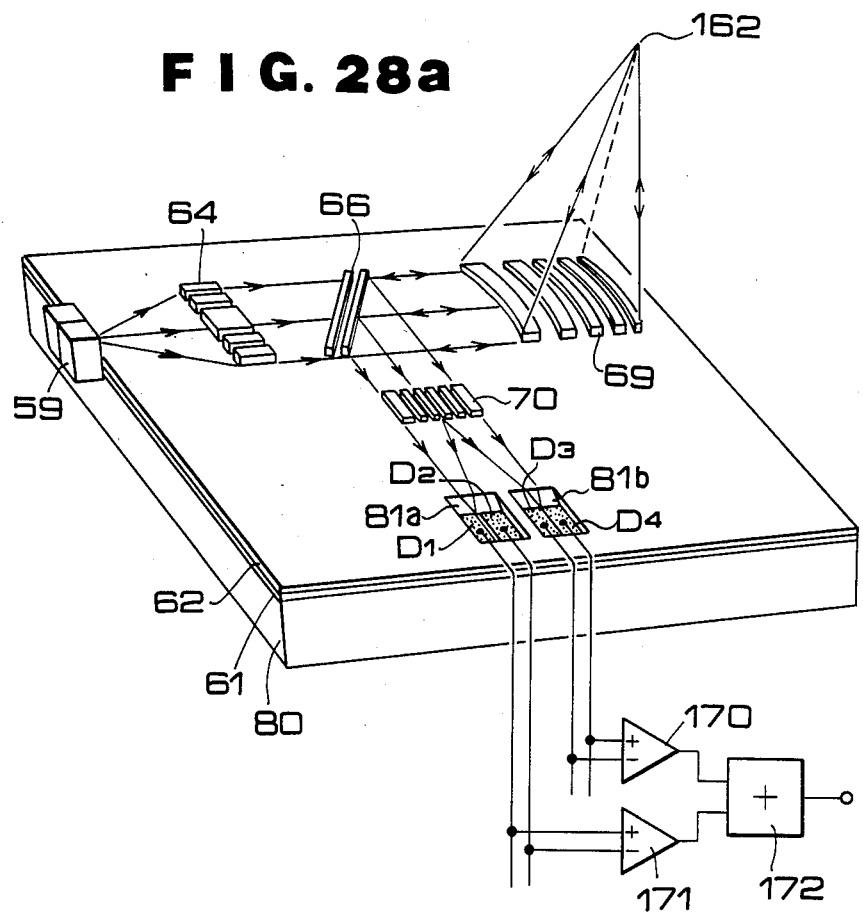
FIG. 28(a) illustrates a modification of the optical head assembly of FIG. 26(a), and FIG. 28(b), is a sectional view of a part of a substrate used in the apparatus of FIG. 28(a).
Figure 28B:
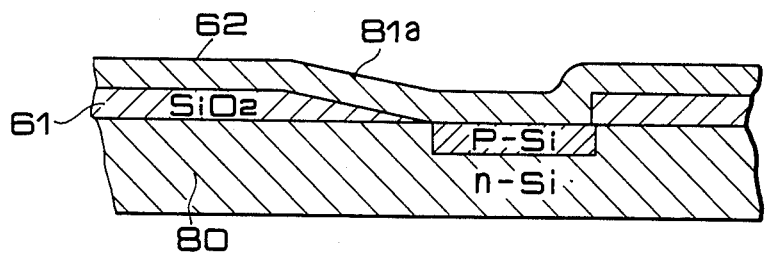

Although in the above embodiments the photo detectors are disposed at an end face of the thin film-like light conducting layer, photo detectors 81a and 81b may be formed monolithically by diffusing impurity on an n-type silicon substrate 80 to thereby form P layer, as shown in FIGS. 28(a) and (b). Further, although in the above embodiments the optical head assembly of the present invention was applied to a system for reproducing information on a disc, it may be applied to an information recording system in which a high-power semiconductor laser modulated with a recording information signal is radiated to a thin film on a disc formed vapour deposition of $TeO_2$, for example.

What is claimed is:

1. An optical head assembly used for recording information on an optical disc along a predetermined track or for taking out information already recorded, said optical head assembly comprising:

a substrate;

a light conducting layer of a dielectric thin film formed on said substrate;

a laser beam source provided for introducing a diverging laser beam into said light conducting layer;

said light conducting layer including a collimator lens means for collimating said diverging laser beam, a beam splitter and a converging grating coupler for converging the beam which has passed through said beam splitter onto said optical disc to form a beam spot and converting the beam reflected by the surface of said optical disc into a collimated beam advancing toward said beam splitter;

a photo detector disposed in a position in which it receives the collimated beam which reaches said position after entering said beam splitter from said converging grating coupler and being bent there;

said photo detector having two light receiving surfaces which are disposed in positions symmetric with each other relative to a central line of the collimated beam which has been bent by said beam splitter;

said light conducting layer further comprising a diffraction grating disposed between said collimator lens means and said beam splitter, and said substrate being disposed so that a straight line joining a beam spot formed through said converging grating coupler by a zero order beam which is formed by the action of said diffraction grating and an optical center of said converging grating coupler, is perpendicular to the surface of said optical disc.

2. An optical head assembly as set forth in claim 1, wherein said substrate is disposed so that a straight line joining one beam spot of the zero order beam formed through said converging grating coupler and beam spots of two first order beams, is inclined at a predetermined angle to a tangent to said track of said optical disc.

3. An optical head assembling used for recording information on an optical disc along a predetermined track or for taking out information already recorded, said optical head assembly comprising:
   a substrate;
   a light conducting layer of a dielectric thin film formed on said substrate film;
   a laser beam source provided for introducing a diverging laser beam into said light conducting layer;
   said light conducting layer including a collimator means for collimating said diffused laser beam, a surface acoustic wave generating means for generating periodic fluctuations of refractive index induced on the basis of an elasto-optical effect of said light conducting layer by a surface acoustic wave and thereby periodically deflecting the collimated beam past said collimator means, a beam splitter, and a converging grating coupler for converging the beam which has passed through said beam splitter onto said optical disc to form a beam spot and converting the beam reflected by the surface of said optical disc into a collimated beam advancing toward said beam splitter;
   a photo detector disposed in a position in which it receives the collimated beam which reaches said position after entering said beam splitter from said converging grating coupler and being bent there;
   a frequency sweep oscillator comprising an oscillator for producing a signal for driving said surface acoustic wave generating means and a sweep signal generator for producing a sweep signal for sweeping the oscillation frequency of said oscillator at a predetermined period within a predetermined range;
   a filter for extracting a sweep frequency component of said frequency sweep oscillator from said photo detector;
   a phase detector for detecting an output of said filter on the basis of the output of said sweep signal generator; and
   an adjusting mechanism for adjusting the position of said substrate relative to said optical disc in accordance with a signal provided from said phase detector and allowing said beam spot to trace said track.

4. An optical head assembly as set forth in claim 3, wherein said surface acoustic wave generating means is a comb-like electrode constituted on said light conducting layer.

5. An optical head assembly as set forth in claim 3 or claim 4, wherein said adjusting mechanism is an actuator for moving the entirety of said substrate in a direction perpendicular to the direction of the track on said optical disc.

6. An optical head assembly as set forth in claim 3 or claim 4, wherein said adjusting mechanism is a feedback circuit for feeding back the output of said phase detector to said sweep signal generator so as to vary the oscillation center frequency of said frequency sweep oscillator.

7. An optical head assembly as set forth in claim 3, wherein the sweep frequency range of said frequency sweep oscillator is selected to a value higher than an occupied frequency spectrum of information recorded on said optical head.

8. An optical head assembly as set forth in claim 7, wherein said filter is a high-pass filter.

9. An optical head assembly as set forth in claim 3, wherein the sweep frequency range of said frequency sweep oscillator is selected to a value lower than an occupied frequency spectrum of information recorded on said optical disc.

10. An optical head assembly as set forth in claim 9, wherein said filter is a low-pass filter.

11. An optical head assembly used for recording information on an optical disc along a predetermined track or for taking out information already recorded, said optical head assembly comprising:
    a substrate;
    a light conducting layer of a dielectric thin film formed on said substrate by a dielectric thin film;
    a laser beam source provided for introducing a diverging laser beam into said light conducting layer;
    said light conducting layer including a collimator lens means for collimating said diverging laser beam, a beam splitter, a converging grating coupler for converging the beam which has passed through said beam splitter onto said optical disc to form a beam spot and converting the beam reflected by the surface of said optical disc into a collimated beam advancing toward said beam splitter, and a beam dividing/converging element for dividing and converging the collimated beam which has been bent by said beam splitter into two converged beams;
    two photo detectors disposed in focused positions of said two beams from said beam dividing/converging element.

12. An optical head assembly as set forth in claim 11, wherein said substrate is formed of silicon, and said light conducting layer is formed on an $SiO_2$ layer formed on said silicon substrate.

13. An optical head assembly as set forth in claim 12, wherein said grating coupler is formed by an SiN film.

14. An optical head assembly as set forth in claim 12, wherein said substrate is formed by an n-type silicon, and said photo detector is formed monolithically on said silicon substrate by forming a p-type region on the substrate.

* * * * *

UNITED STATES PATENT AND TRADEMARK OFFICE
CERTIFICATE OF CORRECTION

PATENT NO. : 4,718,052

DATED : January 5, 1988

INVENTOR(S) : Mitsushige Kondo et al.

It is certified that error appears in the above-identified patent and that said Letters Patent is hereby corrected as shown below:

On the first page, under the listed inventors, insert the following:

-- Toshiaki Suhara and Hiroshi Nishihara
both of Osaka, Japan --.

Column 4, line 31, "FIG. 1" should read -- FIG. 10 --.

Signed and Sealed this

Twentieth Day of September, 1988

Attest:

DONALD J. QUIGG

*Attesting Officer*     *Commissioner of Patents and Trademarks*